United States Patent
Yashiro et al.

(10) Patent No.: US 7,223,521 B2
(45) Date of Patent: May 29, 2007

(54) SQUARYLIUM-METAL CHELATE COMPOUNDS AND OPTICAL RECORDING MEDIA

(75) Inventors: Tohru Yashiro, Kanagawa (JP); Tomomi Ishimi, Kanagawa (JP); Tatsuo Mikami, Kanagawa (JP); Ikuo Shimizu, Mie (JP); Motoharu Kinugasa, Mie (JP); Hiroshi Toyoda, Mie (JP)

(73) Assignees: Ricoh Company, Ltd., Tokyo (JP); Kyowa Hakko Kogyo Co., Ltd., Tokyo (JP); Kyowa Yuka Co., Ltd., Tokyo (JP)

( * ) Notice: Subject to any disclaimer, the term of this patent is extended or adjusted under 35 U.S.C. 154(b) by 480 days.

(21) Appl. No.: 10/776,973

(22) Filed: Feb. 11, 2004

(65) Prior Publication Data

US 2004/0202098 A1  Oct. 14, 2004

(30) Foreign Application Priority Data

Feb. 12, 2003  (JP)  ............................ 2003-034358

(51) Int. Cl.
*G11B 7/24* (2006.01)
(52) U.S. Cl. ................ 430/270.14; 430/945; 428/64.8; 369/284; 369/288
(58) Field of Classification Search ...................... None
See application file for complete search history.

(56) References Cited

U.S. PATENT DOCUMENTS 5,085,909 A  2/1992  Satoh et al.

(Continued)

FOREIGN PATENT DOCUMENTS

EP  1132902 A1  9/2001

(Continued)

OTHER PUBLICATIONS

U.S. Appl. No. 09/569,501 to Yamada et al., filed May 11, 2000.

*Primary Examiner*—Martin Angebranndt
(74) *Attorney, Agent, or Firm*—Cooper & Dunham LLP

(57) ABSTRACT

Squarylium-metal chelate compounds as recording materials for optical recording media, and optical recording media using these compounds, which have excellent recording properties, light resistance and storage stability. The squarylium-metal chelate compound is represented by following Structural Formulas (1) and (2):

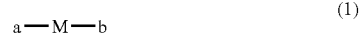

(1)

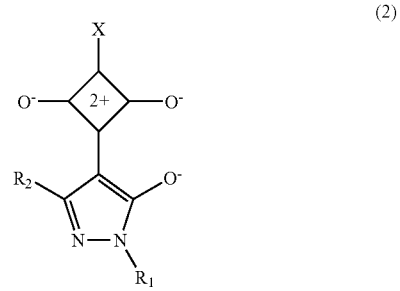

(2)

In the formula (1), M represents a metal atom capable of coordinating; "a", "b" and "c" each represents a squarylium dye ligand of formula (2), where "a" is different from "b"; and "c" may be the same as or different from "a" or "b"; and "m" represents 0 or 1. In the formula (2), $R_1$ and $R_2$ are the same or different and each represents an alkyl group, aralkyl group, aryl group or heterocyclic group, each of which may be substituted; and X represents an aryl group which may be substituted, a heterocyclic group which may be substituted, or $Z_3$=CH—, wherein $Z_3$ represents a heterocyclic group which may be substituted.

13 Claims, 2 Drawing Sheets

U.S. PATENT DOCUMENTS

| | | |
|---|---|---|
| 5,149,819 A | 9/1992 | Satoh et al. |
| 5,169,745 A | 12/1992 | Yashiro et al. |
| 5,238,722 A | 8/1993 | Yashiro et al. |
| 5,242,730 A | 9/1993 | Yashiro et al. |
| 5,252,372 A | 10/1993 | Yashiro et al. |
| 5,256,794 A | 10/1993 | Satoh et al. |
| 5,316,814 A | 5/1994 | Sawada et al. |
| 5,391,741 A | 2/1995 | Shimizu et al. |
| 5,510,229 A | 4/1996 | Satoh et al. |
| 5,532,033 A | 7/1996 | Yashiro |
| 5,580,696 A | 12/1996 | Yashiro |
| 5,660,970 A | 8/1997 | Shimizu et al. |
| 5,789,138 A | 8/1998 | Yashiro |
| 5,882,757 A | 3/1999 | Yashiro |
| 5,932,721 A | 8/1999 | Yashiro et al. |
| 5,968,708 A | 10/1999 | Yashiro et al. |
| 6,043,355 A | 3/2000 | Yashiro et al. |
| 6,045,971 A | 4/2000 | Yashiro |
| 6,137,769 A | 10/2000 | Sawada et al. |
| 6,469,963 B1 | 10/2002 | Sawada et al. |
| 6,558,768 B2 | 5/2003 | Noguchi et al. |
| 6,562,432 B2 | 5/2003 | Ogawa et al. |
| 6,596,364 B2 | 7/2003 | Shimizu et al. |
| 6,599,605 B2 | 7/2003 | Shimizu et al. |
| 6,737,143 B2 | 5/2004 | Noguchi et al. |
| 6,794,114 B2 * | 9/2004 | Shoda et al. ............ 430/270.16 |
| 2003/0059712 A1 | 3/2003 | Yashiro |
| 2003/0063539 A1 | 4/2003 | Yashiro |
| 2003/0124459 A1 | 7/2003 | Yashiro et al. |
| 2003/0187272 A1 | 10/2003 | Shimizu et al. |
| 2003/0206514 A1 | 11/2003 | Noguchi et al. |
| 2003/0215673 A1 | 11/2003 | Mikami et al. |

FOREIGN PATENT DOCUMENTS

| | | |
|---|---|---|
| EP | 1152001 A1 | 11/2001 |
| EP | 1135357 A1 | 8/2003 |
| JP | 2000-343821 * | 12/2000 |
| WO | 02/50190 | 6/2002 |

* cited by examiner

SQUARYLIUM-METAL CHELATE COMPOUNDS AND OPTICAL RECORDING MEDIA

BACKGROUND OF THE INVENTION

1. Field of the Invention

The present invention relates to squarylium-metal chelate compounds which are suitable for recording materials in optical recording media, and to optical recording media comprising the squarylium-metal chelate compounds.

2. Description of the Related Art

Recordable DVD media have been developed as optical discs with a large capacity. The possibilities of increasing the recording capacity of the DVD media are in the development of a recording material that can minimize a recording pit to be formed, introduction of image compression technologies such as Moving Picture Experts Group-2 (MPEG 2), and improvement in the method of shortening the wavelength of the semiconductor laser used to read the recording pit.

An AlGaInP laser diode with a wavelength of 670 nm is only one red semiconductor laser that has been developed and commercialized for a bar code reader and a measuring instrument. Along with the development of the optical discs with a high recording density, the red semiconductor laser has been introduced and used in practice in the optical recording industry. For a driving system for a digital versatile disc (DVD), laser diodes with wavelengths from 645 nm to 675 nm are standardized as the light sources. A reproduction-only DVD-ROM drive equipped with a light source with a wavelength of about 650 nm is now commercially available.

Under such circumstances, archival recordable DVD media must have excellent light resistance and storage stability and be capable of recording and reproducing information by an optical pickup system using a laser beam having a wavelength of 645 nm to 675 nm.

To achieve the above performance, recording materials that form recording pits upon irradiation with light must be developed. Optical recording media using a variety of organic dyes have been developed. A squarylium compound can be given as an example of the materials used for a recording layer of an optical recording medium which carries out recording and reproducing information by the light pickup using a laser having a wavelength of 645 nm to 675 nm. The conventional squarylium compound, however, is significantly deteriorated by light irradiation, is not stable and cannot record information stably at the wavelengths ranging from 645 nm to 675 nm.

Highly reflective DVD media using a dye-containing recording layer (DVD+R and DVD−R media) utilize multiple reflection at the interface of a dye film. For yielding both satisfactory recording sensitivity and reflection ratio, the birefringence of the dye film must be controlled within proper ranges, i.e. a refractive index n of the recording layer alone of 1.5 to 3.0 and an extinction coefficient k of 0.02 to 0.3 with respect to light having a wavelength in a range of the recording-reproducing wavelength ±5 nm.

To satisfy the optical properties of the recording layer, the absorption edge in longer wavelengths of optical absorption in the dye film may be used as a recording-reproducing wavelength in DVD+R, DVD−R, and CD-R media, as shown in FIG. 1. However, according to this technique, the optical properties at the above wavelengths of laser often vary due to a large dependency on wavelength at the absorption edge.

As a possible solution to increase the light resistance of a recording layer, a formazan-metal chelate compound is exemplified as a highly light-resistant dye. However, a recording layer containing this dye alone generally has a low absorption coefficient and does not yield the aforementioned suitable birefringence.

A variety of organic dyes are used for the recording layer, and examples of optical recording media using these organic dyes are as follows:

(1) Write-once, read-many-times (WORM) optical discs such as (i) those using a cyanine dye (Japanese Patent Application Laid-Open (JP-A) No. 60-89842 and No. 61-25886); and those using a phthalocyanine dye (JP-A No. 63-37991 and No. 63-39888).

(2) Overwritable compact discs (CD-Rs) such as (i) those using a cyanine dye in combination with a metal reflective layer (JP-A No. 02-13656 and No. 02-168446); (ii) those using a phthalocyanine dye in combination with a metal reflective layer (JP-A No. 05-139044); and (iii) those using an azo-metal chelate dye in combination with a metal reflective layer (JP-A No. 08-231866 and No. 08-295811).

(3) Overwritable digital versatile discs (DVD-Rs) with a large capacity such as (i) those using a cyanine dye in combination with a metal reflective layer (JP-A No. 10-235999, and Pioneer R&D vol. 6, No. 2, 1996); (ii) those using an azomethine dye in combination with a metal reflective layer (JP-A No. 08-283263 and No. 10-273484); (iii) those using an azo-metal chelate compound and a metal reflective layer (JP-A No. 10-36693, No. 11-12483, and No. 2001-322356); (iv) those using a styryl dye in combination with a metal reflective layer (JP-A No. 11-144313 and No. 11-165466); (v) those using a formazan dye in combination with a metal reflective layer (JP-A No. 10-337958 and No. 2001-23235); and (vi) those using another dye in combination with a metal reflective layer (JP-A No. 10-309871 and No. 10-309872).

SUMMARY OF THE INVENTION

Accordingly, an object of the present invention is to provide a squarylium-metal chelate compound usable as a recording material in an optical recording medium that is applicable to recordable DVD disc systems. Another object of the present invention is to provide an optical recording medium using the squarylium-metal chelate compound and having good recording properties, satisfactory light resistance and excellent storage stability.

Specifically, the present invention provides a squarylium-metal chelate compound represented by following Structural Formula (1):

wherein M represents a metal atom capable of coordinating; "a", "b" and "c" each represent a squarylium dye ligand represented by following Structural Formula (2), where "a" is different from "b"; and "c" may be the same as or different from "a" or "b"; and "m" represents 0 or 1:

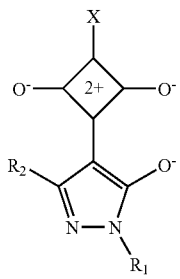

(2)

wherein $R_1$ and $R_2$ are the same or different and each represents one of an alkyl group, an aralkyl group, an aryl group and a heterocyclic group, each of which may be substituted; and X represents one of an aryl group which may be substituted, a heterocyclic group which may be substituted and $Z_3$=CH—, wherein $Z_3$ represents a heterocyclic group which may be substituted.

In addition, the present invention provides an optical recording medium comprising a substrate and a recording layer arranged on or above the substrate, wherein the recording layer includes, as a recording material, two or more different types of the squarylium-metal chelate compounds. The optical recording media of the present invention use, as a dye for recording layer, a mixture of two or more of the squarylium-metal chelate compounds of the present invention having a specific structure. Thus, the optical recording media have improved optical properties such as those in wavelength dependency and are useful for next-generation high-capacity optical disc systems using laser beams with a wavelength of 645 nm to 675 nm. The optical recording media preferably further contain a formazan-metal chelate compound in the recording layer. Thus, they have further excellent light resistance and storage stability.

DESCRIPTION OF THE PREFERRED EMBODIMENTS

Squarylium-metal Chelate Compounds

Figure 1:
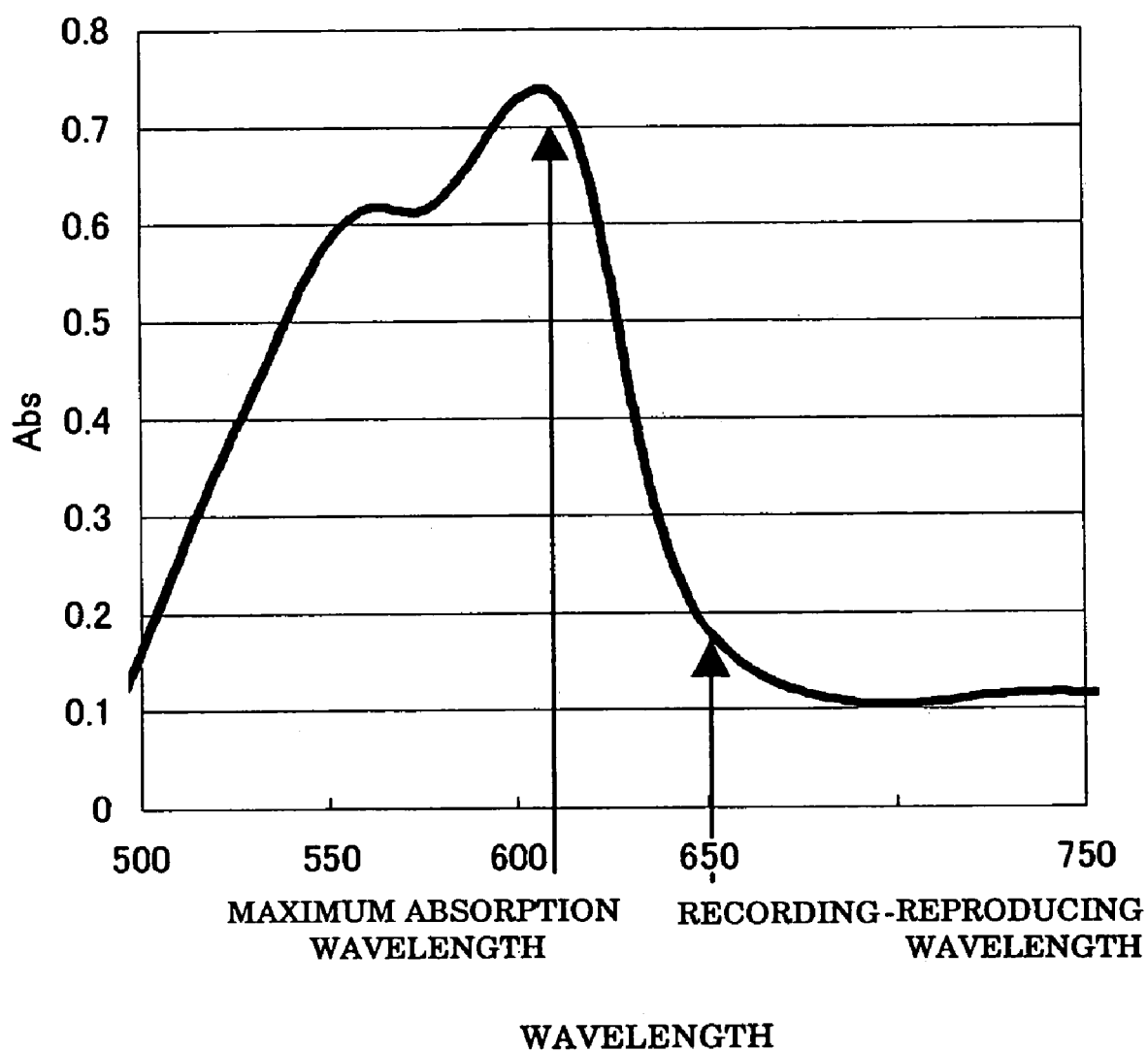
FIG. 1 is a diagram showing the optical absorption spectrum of a recording layer and the recording-reproducing wavelength.

The squarylium-metal chelate compounds are represented by following Structural Formula (1):

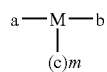

(1)

wherein M represents a metal atom capable of coordinating; "a", "b" and "c" each represent a squarylium dye ligand represented by following Structural Formula (2), where "a" is different from "b"; and "c" may be the same as or different from "a" or "b"; and "m" represents 0 or 1:

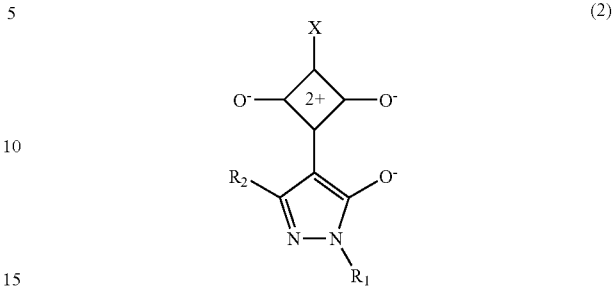

(2)

wherein $R_1$ and $R_2$ are the same or different and each represents one of an alkyl group, an aralkyl group, an aryl group and a heterocyclic group, each of which may be substituted; and X represents one of an aryl group, a heterocyclic group and $Z_3$=CH—, each of which may be substituted, wherein $Z_3$ represents a heterocyclic group which may be substituted.

The substituent X is preferably a group represented by following Structural Formula (3):

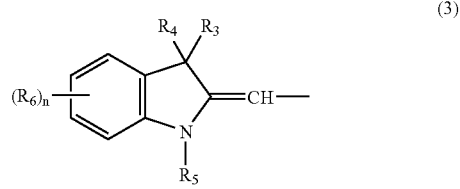

(3)

wherein $R_3$ and $R_4$ may be the same or different and each represents a substituted or unsubstituted alkyl group, where $R_3$ and $R_4$ may be taken together with an adjacent carbon atom to form a ring; $R_5$ represents one of a hydrogen atom, an alkyl group, an aralkyl group and an aryl group, each of which may be substituted; $R_6$ represents one of a halogen atom, an alkyl group which may be substituted, an aralkyl group which may be substituted, an aryl group which may be substituted, a nitro group, a cyano group and an alkoxy group; and "n" represents an integer from 0 to 4, wherein, when n is 2, 3 or 4, $R_6$ may be the same or different and adjacent two $R_6$ may be taken together with two adjacent carbon atoms to form a ring.

In Structural Formulae (2) and (3), the alkyl group and the alkyl moiety in the alkoxy group are preferably a linear or branched alkyl group having 1 to 15 carbon atoms, of which one having 1 to 8 carbon atoms is more preferred, or a cyclic alkyl group having 3 to 8 carbon atoms. Specific examples thereof are methyl group, ethyl group, propyl group, isopropyl group, butyl group, isobutyl group, sec-butyl group, tert-butyl group, pentyl group, isopentyl group, 1-methylbutyl group, 2-methylbutyl group, tert-pentyl group, hexyl group, cyclopropyl group, cyclobutyl group, cyclopentyl group, cyclohexyl group, cycloheptyl group, cyclooctyl group, and the like.

The aralkyl group is preferably an aralkyl group having 7 to 19 carbon atoms, of which one having 7 to 15 carbon atoms is more preferred. Specific examples thereof are benzyl group, phenethyl group, phenylpropyl group, naphthylmethyl group, and the like.

The aryl group is preferably an aryl group having 6 to 18 carbon atoms, of which one having 6 to 14 carbon atoms is more preferred. Specific examples thereof are phenyl group, naphthyl group, anthryl group, azulenyl group, and the like.

Examples of the halogen atom are chlorine atom, bromine atom, fluorine atom and iodine atom.

Examples of the heterocyclic group include groups derived from heterocyclic compounds each having at least one hetero atom such as nitrogen atom, oxygen atom, sulfur atom or selenium atom as an atom constituting the ring. The total number of the atoms constituting the heterocyclic ring and including the hetero atom(s) is preferably from five to eight and more preferably five or six.

The heterocyclic ring may be a monocycle or a fused or chain-like polycycle comprising two or more (preferably two to eight, and more preferably two to six) heterocyclic monocycles, as well as a carbocycle-fused heterocycle having a carbocycle such as benzene ring, naphthalene ring, or the like fused with a heterocycle.

The heterocyclic ring includes an aromatic heterocyclic ring and an aliphatic heterocyclic ring.

Specific examples of the heterocyclic ring are pyridine ring, pyrazine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiophene ring, furan ring, thiazole ring, oxazole ring, indole ring, isoindole ring, indazole ring, benzimidazole ring, benzotriazole ring, benzothiazole ring, benzoxazole ring, purine ring, carbazole ring, pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoqunoline ring, tetrahydrofuran ring, tetrahydropyran ring, dihydrobenzofuran ring, tetrahydrocarbazole ring, and the like.

The heterocyclic ring $Z_3$ in $Z_3$=CH— group may be any of the aforementioned heterocyclic rings. Preferably, the heterocyclic ring can be, for example, any of indoline ring, thiazoline ring, thiazole ring, dihydroquinoline ring, quinoxaline ring, and the like.

Specific examples of $Z_3$ are indolin-2-ylidene, benz[e]indolin-2-ylidene, 2-benzothiazolinylidene, naphtho[2,1-d]thiazol-2(3H)-ylidene, naphtho[1,2-d]thiazol-2(1H)-ylidene, 1,4-dihydroquinolin-4-ylidene, 1,2-dihydroquinolin-2-ylidene, 2,3-dihydro-1H-imidazo[4,5-d]quinoxalin-2-ylidene, 2-benzoselenazolinylidene, and the like.

In Structural Formula (3), $R_3$ and $R_4$ may be taken together with an adjacent carbon atom to form a ring such as an alicyclic hydrocarbon ring or an aliphatic heterocyclic ring. The alicyclic hydrocarbon ring herein may be a saturated or unsaturated alicyclic hydrocarbon ring having three to eight carbon atoms, such as cyclopropane ring, cyclobutane ring, cyclopentane ring, cyclohexane ring, cycloheptane ring, cyclooctane ring, cyclopentene ring, 1,3cyclopentadiene ring, cyclohexene ring, cyclohexadiene rings, or the like. The aliphatic heterocyclic ring may be a saturated or unsaturated alicyclic heterocyclic ring having three to eight atoms constituting the ring, of which one having five or six constitutional atoms is preferred. Examples thereof are pyrazoline ring, pyrazolidine ring, piperidine ring, indoline ring, morpholine ring, pyran ring, imidazolidine ring, thiazoline ring, imidazoline ring, oxazoline ring, and the like.

In Structural Formula (3), adjacent two "$R_6$"s may be taken together with two adjacent carbon atoms to form a ring which may be substituted. The ring herein is a ring containing adjacent two carbon atoms on the benzene ring. Examples of such rings are aromatic hydrocarbon rings such as benzene ring, naphthalene ring, and the like.

Examples of substituents which the alkyl group may have are hydroxyl group, carboxyl group, halogen atoms, alkoxy groups, and the like. Examples of the halogen atoms, and the alkyl moieties in the alkoxy groups are the same as mentioned above.

The aforementioned aralkyl group, aryl group, alkoxy group, heterocyclic ring, and hydrocarbon ring may further have one or more substituents. Substituents herein can be any of conventional substituents such as hydroxyl group, carboxyl group, halogen atoms, substituted or unsubstituted alkyl group, alkoxy group, nitro group, substituted or unsubstituted amino group, and the like. Examples of the halogen atoms, substituted or unsubstituted alkyl groups and the alkyl moieties in the alkoxy groups are the same as mentioned above.

The substituted amino groups include monoalkyl-substituted amino groups and dialkyl-substituted amino groups. The alkyl group herein may be the same as mentioned above.

The number of substituents to be substituted on each group is not specifically limited, may be selected according to the purpose and can be one or more (preferably two to five).

In Structural Formula (1), the metal atom M capable of coordinating is preferably a metal atom capable of having two or three ligands, of which a trivalent metal atom is more preferred. Preferred examples of the metal atom are aluminum, zinc, copper, iron, nickel, chromium, cobalt, manganese, iridium, vanadium, and titanium. Among them, a squarylium-aluminum chelate compound has excellent optical properties as an optical recording material.

The squarylium compounds represented by Structural Formula (2) (hereinafter may be referred to as "Compound(s) 2") can be synthetically prepared by a method described in International Publication No. WO 02/50190, and the method of preparing the compounds will be illustrated in detail below.

The synthesis scheme of Compounds 2 is represented by the following reaction formulae.

(1) Reaction Formula (1-a)

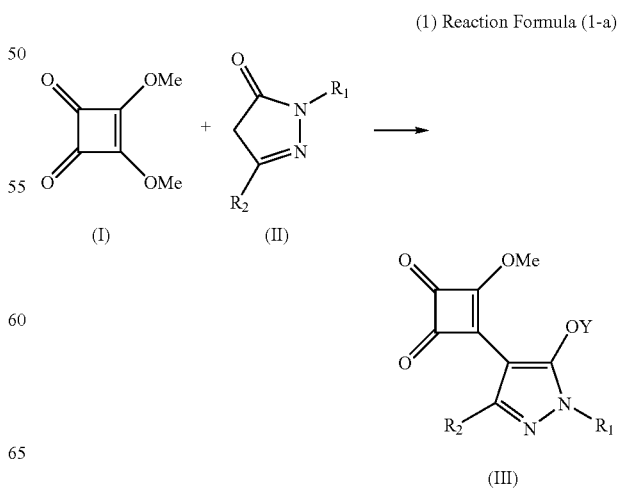

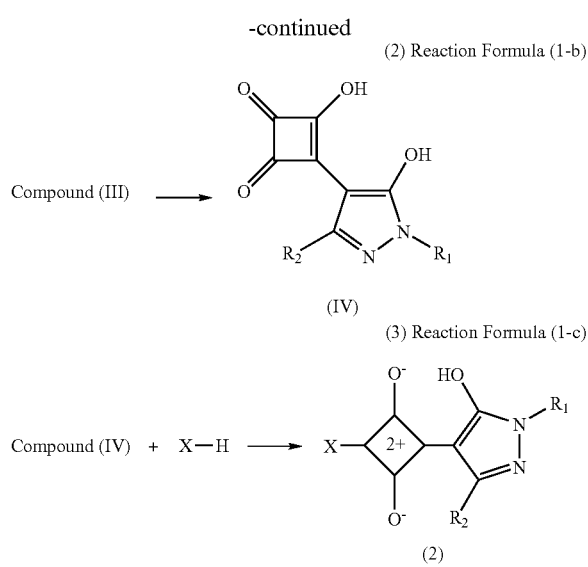

(2) Reaction Formula (1-b)

Compound (III) →

(IV)

(3) Reaction Formula (1-c)

Compound (IV) + X—H →

(2)

In the above reaction formulae, $R_1$ and $R_2$ have the same meanings as defined above; Y represents, for example, hydrogen atom, potassium atom, sodium atom, or the like; and Me represents methyl group.

The preparation of Compound (III) according to Reaction Formula (1-a) will be illustrated below.

Compound (III) can be prepared by reacting Compound (I) with 0.5 to 2 times by mole of Compound (II) in a solvent, where necessary, in the presence of 1 to 2 times by mole of a base at a temperature from room temperature to 40° C. for 30 minutes to 15 hours.

Examples of the base include an inorganic base such as potassium carbonate, sodium carbonate, potassium hydroxide, or the like and an organic base such as triethylamine, sodium methoxide, or the like.

Examples of the solvent include methanol, ethanol and dimethylformamide.

The preparation of Compound (IV) according to Reaction Formula (1-b) will be illustrated below.

Compound (IV) can be prepared by reacting Compound (III) in a basic solvent or in an acidic solvent at room temperature to 40° C. for 30 minutes to 15 hours.

Examples of the basic solvent are aqueous potassium carbonate solution, aqueous sodium carbonate solution, aqueous potassium hydroxide solution, and the like.

Examples of the acidic solvent are 50% by volume/volume solution of hydrochloric acid in aqueous dimethyl sulfoxide solution, 50% volume/volume solution of hydrochloric acid in aqueous dimethylformamide solution, and the like.

The preparation of Compound (2) according to Reaction Formula (1-c) will be illustrated below.

Compound (2) can be prepared by reacting Compound (IV) with 0.5 to 2 times by mole of X-H in a solvent and where necessary in the presence of 0.5 to 2 times by mole of a base at 80° C. to 120° C. for 1 to 15 hours.

Examples of the solvent are of an alcohol solvent having two to eight carbon atoms, such as ethanol, propanol, isopropanol, butanol or octanol, or a mixture of the alcohol solvent with benzene, toluene, xylene, or the like. In the mixture, the amount of alcohol is preferably 50% by volume/volume or more.

The preparation of the squarylium-metal chelate compound represented by Structural Formula (1) [Compound (1)] will be illustrated below.

Reaction Formula (1-d)

$$a+b+m(c)+M^{n+} \rightarrow \text{Compound} \tag{1}$$

wherein a, b, c, m and M have the same meanings as defined above; and $n^+$ represents the valency of the metal M ranging from 1 to 3.

Compound (1) can be prepared by reacting the squarylium compound (a), squarylium compound (b), squarylium compound (c) and metal ion ($M^{n+}$) in a solvent in the presence of acetic acid at a temperature from room temperature to 120° C. for 1 to 15 hours.

Examples of the material for the metal ion $M^{n+}$ are aluminum tris(acetylacetonate), aluminum tris(ethylacetoacetate), aluminum isopropoxide, aluminum sec-butoxide, aluminum ethoxide, aluminum chloride, copper chloride, copper acetate, nickel acetate, and the like.

Examples of the solvent are a halogen solvent such as chloroform, dichloromethane, or the like; an aromatic solvent such as toluene, xylene, or the like; an ether solvent such as tetrahydrofuran, methyl tert-butyl ether, or the like; and an ester solvent such as ethyl acetate, or the like.

Specific examples of the squarylium compounds (2) represented by Structural Formula (2) are as follows.

In the following tables, nPr represents n-propyl group; iPr represents isopropyl group; nBu represents n-butyl group; and Ph represents phenyl group.

TABLE 1 squarylium compound

S-1
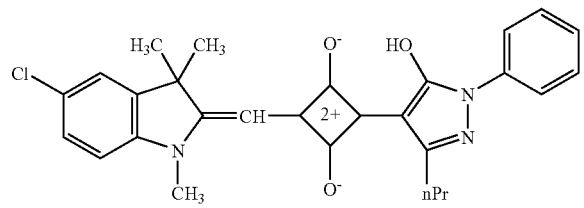

TABLE 1-continued
squarylium compound
S-2
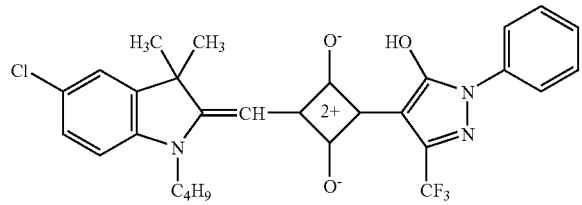
S-3
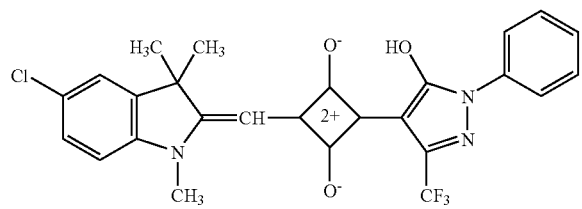
S-4
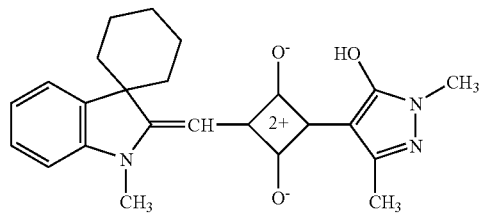
S-5
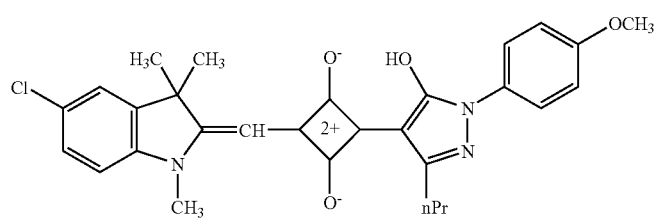
S-6
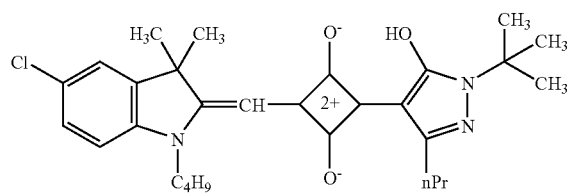
S-7
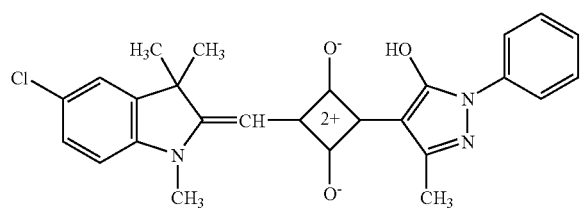

TABLE 2
| squarylium compound | |
|---|---|
| S-8 | 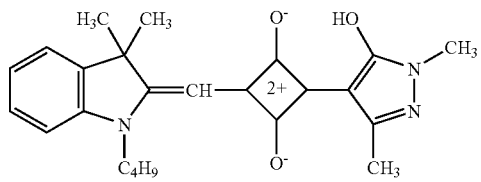 |
| S-9 | 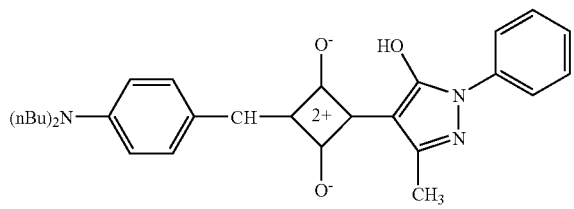 |
| S-10 | 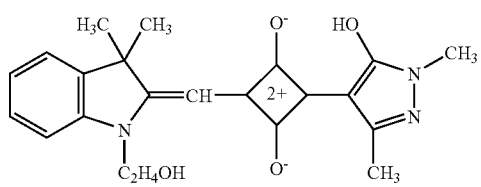 |
| S-11 | 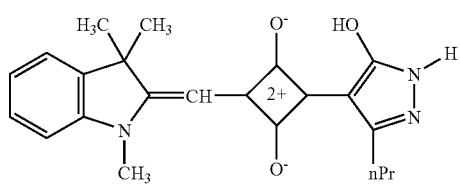 |
| S-12 | 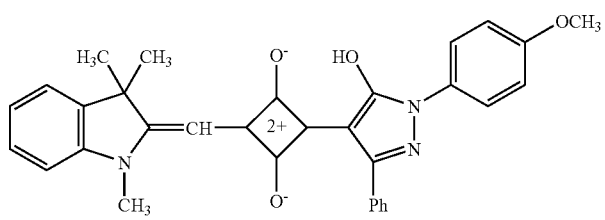 |
| S-13 | 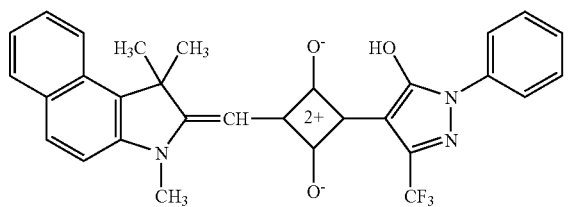 |
| S-14 | 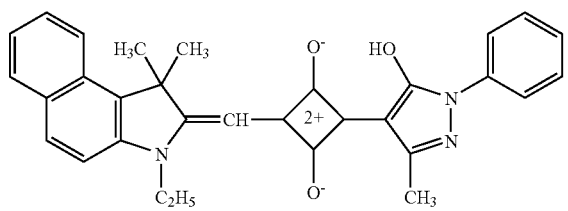 |

TABLE 3 squarylium compound

S-15

[Structure S-15: 5,7-dichloro-1,3,3-trimethylindoline linked via =CH– to squarate (2+) core with two O⁻, connected to pyrazole ring bearing OH, N-phenyl, and nPr substituents]

S-16

[Structure S-16: 1,3,3-trimethylindoline linked via =CH– to squarate (2+) core with two O⁻, connected to pyrazole ring bearing OH, N-(3-methylphenyl), and CH₃ substituents]

S-17

[Structure S-17: 5-chloro-1,3,3-trimethylindoline linked via =CH– to squarate (2+) core with two O⁻, connected to pyrazole ring bearing OH, N-phenyl, and CF₃ substituents]

S-18

[Structure S-18: 1,1,2-trimethyl-benz[e]indoline linked via =CH– to squarate (2+) core with two O⁻, connected to pyrazole ring bearing OH, N-(4-fluorophenyl), and nPr substituents]

In the squarylium-metal chelate compound (1) represented by Structural Formula (1), the squarylium compound (a) and the squarylium compound (b) each used as a ligand for the metal M are different from each other.

The squarylium compound (c) may be the same as or different from the squarylium compound (a) or (b). When the squarylium compound (c) is different from the squarylium compound (a) or (b), at least one of the substituents $R_1$, $R_2$ and X has only to be different between the two compounds.

Optical Recording Media

The optical recording medium of the present invention has a substrate and at least a recording layer arranged on or above the substrate and may further comprise one or more other layers according to necessity.

In the optical recording medium, the recording layer comprises two or more of the squarylium-metal chelate compounds of the present invention as a recording material.

The recording layer in the optical recording medium preferably further comprises, as the recording material, a formazan-metal chelate compound comprising a metal and a formazan compound (4) represented by following Structural Formula (4) in addition to the squarylium-metal chelate compounds (1).

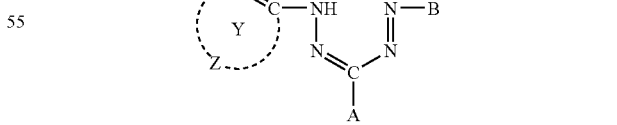

(4)

In Structural Formula (4), Ring Y represents a nitrogen-containing 5-membered or 6-membered ring which may be substituted and which may be condensed with another ring; Z represents an atomic group constituting Ring Y; and A and B each represent a substituent.

In Structural Formula (4), Ring Y is a 5-membered or 6-membered ring having at least one nitrogen atom. Z is an atomic group constituting Ring Y and is selected from carbon (C) and hetero atoms such as N, O or S. Ring Y may be substituted and may be condensed with another ring X. The other ring X can be any of an aromatic carbocycle, an aliphatic carbocycle, an aromatic heterocycle and an aliphatic heterocycle. The ring X may contain from 4 to 12 constitutional atoms, and preferably from 5 to 10 constitutional atoms.

In Structural Formula (4), the substituent A represents an alkyl group, an aryl group, an alkylcarbonyl group, an arylcarbonyl group or an alkyloxycarbonyl group, each of which may be substituted.

The substituent B represents an alkyl group or an aryl group, each of which may be substituted.

Specific examples of Ring Y are thiazole ring, benzothiazole ring, imidazole ring, benzimidazole ring, thiadiazole ring, oxazole ring, benzoxazole ring, triazole ring, pyrazole ring, oxadiazole ring, pyridine ring, pyridazine ring, pyrimidine ring, pyrazine ring, triazine ring, quinoline ring, and the like.

Examples of the substituents to be substituted on Ring Y are the same as those which the heterocyclic ring may have.

The alkyl group, the alkyl moiety in the alkylcarbonyl group, and the alkyl moiety in the alkyloxycarbonyl group each have preferably 1 to 15 carbon atoms and more preferably 1 to 8 carbon atoms. The alkyl group or moiety can be a chain or cyclic alkyl group (cycloalkyl group).

Examples of the alkyl group are a linear alkyl group such as methyl group, ethyl group, n-propyl group, n-butyl group, n-pentyl group, n-hexyl group, n-heptyl group, n-octyl group, n-nonyl group or n-decyl group; a branched alkyl group such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group or tert-octyl group; a cylcoalkyl group such as cyclohexyl group, 4-methylcyclohexyl group, 4-ethylcyclohexyl group, 4-tert-butylcyclohexyl group, 4-(2-ethylhexyl)cyclohexyl group, bornyl group, isobornyl group, adamantyl group, or the like.

The alkyl group may have one or more substituents such as hydroxyl group, a halogen atom, nitro group, carboxyl group, cyano group, an aryl group which may be substituted, or a heterocyclic group which may be substituted. The alkyl group may be substituted with another group via an atom such as oxygen, sulfur or nitrogen atom.

Examples of the alkyl group substituted with another group via oxygen atom include methoxymethyl group, methoxyethyl group, ethoxymethyl group, ethoxyethyl group, butoxyethyl group, ethoxyethoxyethyl group, phenoxyethyl group, methoxypropyl group, ethoxypropyl group, piperidino group, morpholino group, and the like. Examples of the alkyl group substituted with another group via sulfur atom include methylthioethyl group, ethylthioethyl group, ethylthiopropyl group, phenylthioethyl group, and the like. Examples of the alkyl group substituted with another group via nitrogen atom include dimethylaminoethyl group, diethylaminoethyl group, diethylaminopropyl group, and the like.

The aryl group and the aryl moiety in the arylcarbonyl group each have preferably 6 to 18 carbon atoms and more preferably 6 to 14 carbon atoms.

Examples of the aryl group or moiety are phenyl group, naphthyl group, anthranyl group, fluorenyl group, phenalenyl group, phenanthranyl group, triphenylenyl group, pyrenyl group, and the like.

The aryl group may have one or more substituents such as hydroxyl group, a halogen atom, nitro group, carboxyl group, cyano group, an aryl group which may be substituted or a heterocyclic group which may be substituted. The aryl group may also be substituted with the alkyl group via an atom such as oxygen, sulfur or nitrogen atom.

The alkylcarbonyl group can be a group comprising carbonyl group and a substituted or unsubstituted alkyl group directly combined with the carbon atom of the carbonyl group. Examples of the alkyl group herein are the same as mentioned above.

The arylcarbonyl group can be a group comprising carbonyl group and a substituted or unsubstituted aryl group directly combined with the carbon atom of the carbonyl group. Examples of the aryl group herein are the same as mentioned above.

The alkyloxycarbonyl group can be a group comprising oxycarbonyl group and a substituted or unsubstituted alkyl group directly combined with the oxygen atom of the oxycarbonyl group. Examples of the alkyl group herein are the same as mentioned above.

The metal in the formazan-metal chelate compound can be any metal capable of coordinating the formazan compound. Examples of the metal are titanium, vanadium, chromium, manganese, iron, cobalt, nickel, copper, zinc, zirconium, niobium, molybdenum, technetium, ruthenium, rhodium, palladium, as well as oxides, halides, and the like of these metals. Among them, iron, cobalt, nickel, copper, zinc and palladium are excellent to constitute formazan-metal chelate compounds which are satisfactory as optical recording materials. The metal may be partially substituted with, for example, chlorine.

Specific examples of the formazan-metal chelate compounds are as follows. In the following tables, Ph represents phenyl group.

TABLE 4
| formazan metal chelate compound | metal |
|---|---|
| F-1 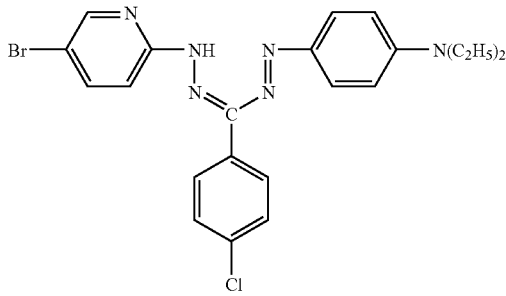 | VCl₃ |
| F-2 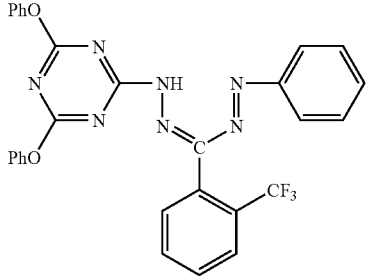 | Ni |
| F-3 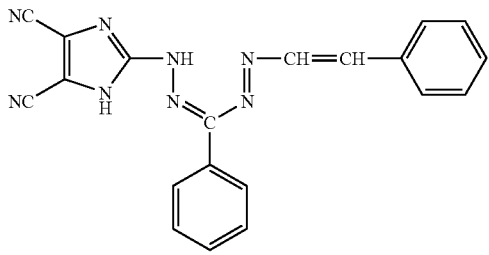 | Ni |
| F-4 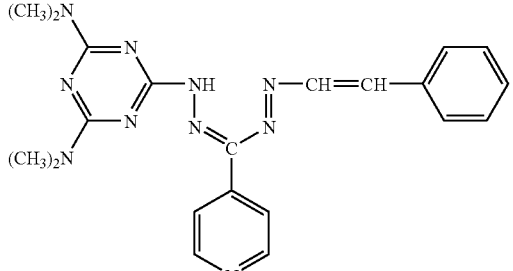 | Co |
| F-5 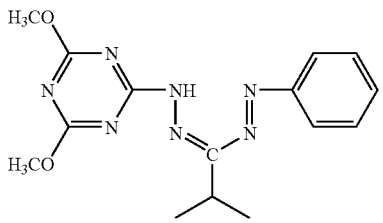 | Cu |

TABLE 5

| formazan metal chelate compound | | metal |
|---|---|---|
| F-6 | [structure] | Ni |
| F-7 | [structure] | Co |
| F-8 | [structure] | Cu |
| F-9 | [structure] | Cu |
| F-12 | [structure] | Ni |

TABLE 6

| formazan metal chelate compound | | metal |
|---|---|---|
| F-13 | [structure] | FeCl$_3$ |
| F-14 | [structure] | Mn |
| F-15 | [structure] | Co |

The recording layer of the optical recording medium comprises two or more, preferably two to six different squarylium-metal chelate compounds (1).

The total content of the squarylium-metal chelate compounds (1) in the recording layer is preferably from 50% by weight to 100% by weight, and more preferably from 60% by weight to 80% by weight.

The total content of the formazan-metal chelate compound(s), if any, in the recording layer is preferably from 5% by weight to 50% by weight, and more preferably from 20% by weight to 40% by weight.

The recording layer in the optical recording medium preferably comprises two or more different types of the squarylium-metal chelate compounds (1) and one or more types of the formazan-metal chelate compounds (5). In this case, the weight ratio of the squarylium-metal chelate compounds (1) to the formazan-metal chelate compound(s) (5) is preferably from 90:10 to 50:50, and more preferably from 80:20 to 60:40.

When the recording layer comprises these components in a weight ratio within the above range, the formazan-metal chelate compound(s) (5) may effectively function to yield high light resistance, and the recording layer may easily yield a suitable birefringence for satisfactory reflection ratio and recording sensitivity as specified in the system specifications (DVD media specifications).

The recording layer may further comprise one or more dye materials in addition to the squarylium-metal chelate compounds and the formazan-metal chelate compounds. Examples of such dye materials are cyanine dyes, phthalocyanine dyes, pyrylium/thiopyrylium dyes, azulenium dyes, azo dyes, dyes of complex salt of metal such as Ni or Cr, naphthoquinone/anthraquinone dyes, indophenol dyes, indoaniline dyes, triphenylmethane dyes, triallylmethane dyes, aminium/diiminium dyes and nitroso compounds. Where necessary, the recording layer may further comprise additional components such as a binder and a stabilizer.

The thickness of the recording layer is preferably from 100 to 5000 angstroms (from 10 nm to 500 nm), and more preferably from 500 to 3000 angstroms (from 50 nm to 300 nm) for better recording sensitivity and satisfactory reflection ratio.

The recording layer of the optical recording medium should have satisfactory optical properties.

For satisfactory optical properties, the recording layer preferably has a large absorption band in shorter wavelengths, i.e., in a recording-reproducing wavelength ranging from 645 nm to 675 nm and can record and reproduce information upon irradiation of light with a wavelength in the vicinity of a longer wavelength edge in the absorption band. In other words, the recording layer preferably has a large refractive index and a large extinction coefficient at the recording-reproducing wavelength ranging from 645 nm to 675 nm.

More specifically, the recording layer alone preferably has a refractive index n of 1.5 to 3.0 and an extinction coefficient k of 0.02 to 0.3 with respect to light with a wavelength ±5 nm of the recording-reproducing wavelength. A refractive index n of 1.5 or more yields a satisfactory optical change and a high recording modulation factor. A refractive index n of 3.0 or less yields decreased dependency on wavelength, thus reducing error at the recording-reproducing wavelength. An extinction coefficient k of 0.02 or more leads to high recording sensitivity. An extinction coefficient k of 0.3 or less easily leads to a reflection ratio of 50% or more.

If the recording layer alone has a low extinction coefficient k at a longer wavelength (675 nm), the recording layer preferably further comprises a dye having a maximum optical absorption peak at the longer wavelength (675 nm) in addition to the squarylium-metal chelate compounds and the formazan-metal chelate compound(s). Examples of the dye are phthalocyanine dyes, tetramethylcyanine dyes, azo dyes, and the like. The content of the dye in the recording layer for adjusting the extinction coefficient k is preferably from 0.5% by weight to 20% by weight.

The recording material (as a mixture of two or more of the squarylium-metal chelate compounds or as a mixture of two or more of the squarylium-metal chelate compounds and at least one formazan-metal chelate compound) for use in the present invention has a thermal decomposition temperature of preferably from 200° C. to 350° C. and more preferably from 250° C. to 350° C.

A thermal decomposition temperature of lower than 200° C. may often invite decreased storage stability of recording pits. A thermal decomposition temperature higher than 350° C. may invite a decreased recording sensitivity. The thermal decomposition temperature as used herein means an inflection point in thermogravimetric analysis (TG) using a thermobalance.

The substrate in the optical recording medium may generally have a guide groove having a depth of 1000 to 2500 angstroms (100 nm to 250 nm). The track pitch of the guide groove is preferably from 0.7 µm to 0.8 µm for use in DVD media. The groove width is, at a half bandwidth, preferably 0.18 µm to 0.40 µm. At the half bandwidth of 0.18 µm or greater, tracking error signals having a sufficient intensity can be attained easily. At the half bandwidth is 0.40 µm or less, spreading of a recorded portion in the width direction can be prevented.

Next, the configuration of the optical recording medium of the present invention will be illustrated.

Figure 2A:
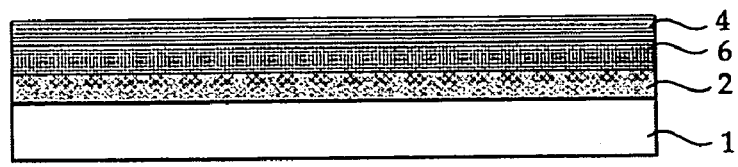
FIGS. 2A, 2B and 2C are each a schematic diagram of a configuration of an optical recording medium for CD-R system as an embodiment of the present invention.
Figure 2B:
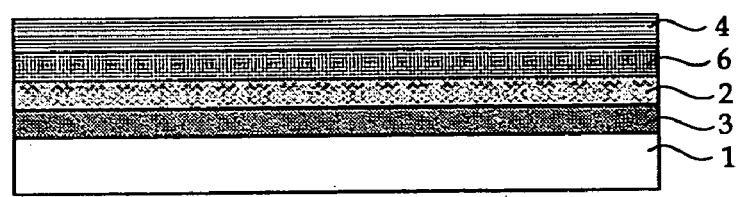
Figure 2C:
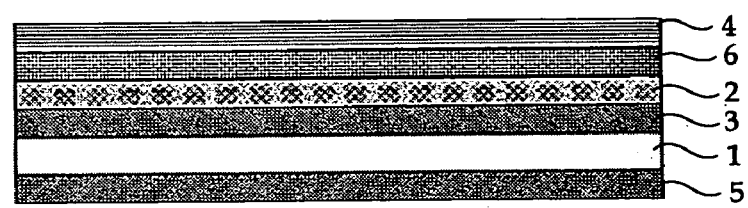

FIGS. 2A, 2B and 2C are each a diagram showing a possible layer configuration of the optical recording medium as CD-R media. FIGS. 2A, 2B and 2C illustrate a substrate 1, a recording layer 2, an undercoat layer 3, a protective layer 4, a hardcoat layer 5 and a metal reflective layer 6.

Figure 3A:
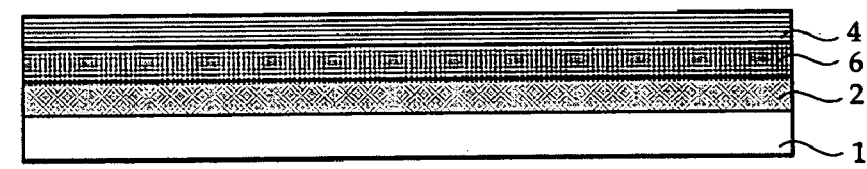
FIGS. 3A, 3B and 3C are each a schematic diagram of a configuration of an optical recording medium for DVD+R system as an embodiment of the present invention.
Figure 3B:
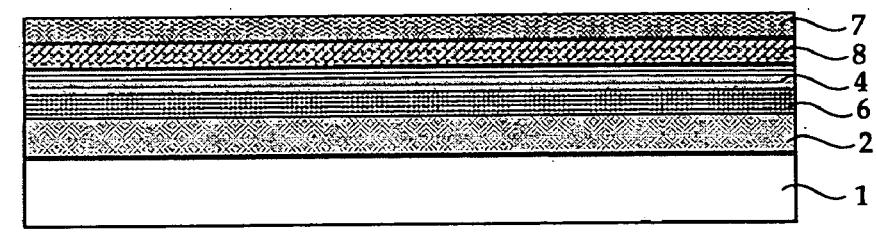
Figure 3C:
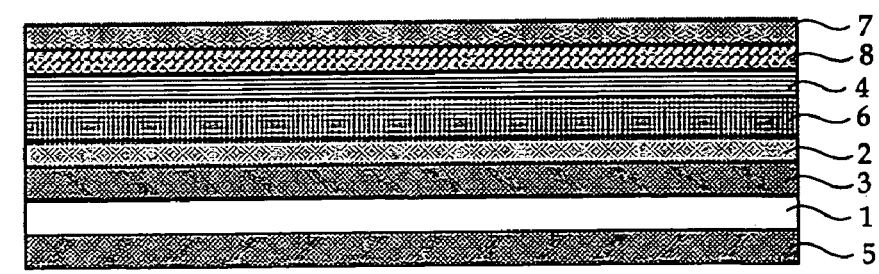

FIGS. 3A, 3B and 3C are each a diagram showing another possible layer configuration of the optical recording medium as recordable DVD media. FIGS. 3A, 3B and 3C illustrate a substrate 1, a recording layer 2, an undercoat layer 3, a protective layer 4, a hardcoat layer 5, a metal reflective layer 6, a protective substrate 7 and an adhesive layer 8. The optical recording media in FIGS. 3B and 3C each have the adhesion layer 8 and the protective substrate 7 on the protective layer 4 of the configuration of FIGS. 2A, and 2C, respectively.

When the optical recording medium is used as a DVD medium, it basically comprise a first substrate and a second substrate bonded via the recording layer with an adhesive. The recording layer may have a reflective layer, may be arranged on the substrate with the interposition of an undercoat layer and/or protective layer and may have these layers thereon for better functions. The configuration most generally employed is the configuration of the first substrate 1, recording layer (organic dye layer) 2, metal reflective layer 6, protective layer 4, adhesive layer 8 and second substrate 7 arranged in this order as illustrated in FIG. 3B.

Other constitutional materials will be illustrated below.

Materials for the substrates used in the present invention can be arbitrarily selected from various materials used for substrates of conventional information recording media.

Examples of the materials for substrates are acrylic resins such as poly(methyl methacrylate); vinyl chloride resins such as poly(vinyl chloride) and vinyl chloride copolymers; epoxy resins; polycarbonate resins; amorphous polyolefins; polyesters; glass such as soda-lime glass; and ceramics. Among them, poly(methyl methacrylate), polycarbonate resins, epoxy resins, amorphous polyolefins, polyesters and glass are preferred for satisfactory dimensional stability, transparency and flatness, of which polycarbonates are more preferred for better moldability when a guide groove and/or a pit is formed on the surface of substrate.

The recording layer may be arranged on the substrate with the interposition of an undercoat layer for better flatness, better adhesion and preventing deterioration of the recording layer. Examples of the material for the undercoat layer are poly(methyl methacrylate)s, acrylic acid-methacrylic acid copolymers, styrene-maleic anhydride copolymers, poly(vinyl alcohol)s, N-methylolacrylamide, styrene-sulfonic acid copolymers, styrene-vinyltoluene copolymers, chlorosulfonated polyethylenes, nitrocellulose, poly(vinyl chloride)s, chlorinated polyolefins, polyesters, polyimides, vinyl acetate-vinyl chloride copolymers, ethylene-vinyl acetate copolymers, polyethylenes, polypropylenes, polycarbonates and other polymeric substances; silane coupling agents and other organic substances; and inorganic oxides such as $SiO_2$ and $Al_2O_3$, inorganic fluorides such as $MgF_2$, other inorganic substances, and the like. The thickness of the undercoat layer is generally from 0.005 μm to 20 μm and preferably from 0.01 μm to 10 μm.

The optical recording medium may further comprise a pregroove layer for forming a tracking groove or depressions and protrusions for indicating information such as address signals on the substrate or the undercoat layer. As the material for the pregroove layer, a mixture of at least one monomer (or oligomer) selected from monoesters, diesters, triesters and tetraesters of acrylic acid with a photopolymerization initiator can be used.

The optical recording medium may further comprise a reflective layer on the recording layer for a higher signal-to-noise ratio (S/N ratio) and reflection ratio and a higher recording sensitivity. The light-reflective substance as a material for the reflective layer is a substance having a high reflection ratio against laser light. Examples of such substances are metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si, Nd, and the like. Among them, Au, Al and Ag are preferred. Each of these substances can be used alone or in combination as a mixture or an alloy. The reflective layer has a thickness of generally from 100 to 3000; angstroms (from 10 nm to 300 nm).

The optical recording medium may comprise a protective layer on the recording layer or reflective layer for physically and chemically protecting the recording layer and other layers. It may also comprise another protective layer on the substrate on an opposite side to the recording layer for improving scratch resistance and moisture resistance. Examples of the material for the protective layer are SiO, $SiO_2$, $MgF_2$, $SnO_2$ and other inorganic substances, as well as thermoplastic resins, thermosetting resins, and ultraviolet curable resins. The protective layer has a thickness of preferably from 500 angstroms (50 nm) to 50 micrometers.

A method for producing the optical recording medium of the present invention will be described.

The optical recording medium can be produced, for example, by a method comprising the steps of forming a recording layer mainly comprising the squarylium-metal chelate compounds represented by Structural Formula (1) on a substrate having at least one of a groove and a pit on its surface directly or with the interposition of another layer using coating-film-forming means; forming a light reflective layer on the recording layer directly or with the interposition of another layer using vacuum film-forming means; and forming a protective layer on the light reflective layer. More specifically, the production method preferably comprises the following processes (i) to (iii):

(i) A recording layer forming process for forming a recording layer mainly comprising the squarylium-metal chelate compounds represented by Structural Formula (1) on a substrate having a groove and/or a pit on its surface directly or with the interposition of another layer using coating-film-forming means; (ii) a light reflective layer forming process for forming a light reflective layer on the recording layer directly or with the interposition of another layer using vacuum film-forming means; and (iii) a protective layer forming process for forming a protective layer on the light reflective layer.

Recording Layer Forming Process

According to the above method, initially, a recording layer mainly comprising the squarylium-metal chelate compounds represented by Structural Formula (1) is formed on a substrate having a groove and/or a pit on its surface directly or with the interposition of another layer using coating-film-forming means. More specifically, the squarylium-metal chelate compounds represented by Structural Formula (1) are dissolved in a solvent to form a coating liquid, and the coating liquid is applied to the substrate to form the recording layer.

Examples of the solvent for use in the coating liquid are known organic solvents such as alcohols, Cellosorves, carbon halides, ketones, ethers, and the like. The coating liquid is preferably applied by spin coating for easily controlling the thickness of film. The film thickness in this procedure can be controlled by adjusting the concentration and viscosity of the coating liquid, and the drying temperature of the solvent.

An undercoat layer may be formed on the substrate before applying the coating liquid for recording layer thereon in order to increase the flatness of the substrate surface, to increase the adhesion and to prevent deterioration of the recording layer.

The undercoat layer can be formed, for example, by dissolving or dispersing the substance for the undercoat layer in a suitable solvent to form a coating liquid, and applying the coating liquid to the surface of substrate according to a coating procedure such as spin coating, dip coating, extrusion coating, or the like.

Light Reflective Layer Forming Process

In the production method, a light reflective layer is formed on the recording layer directly or with the interposition of another layer using means for forming a film in vacuo. More specifically, the aforementioned light reflective substance is applied, for example, by vapor deposition, sputtering or ion plating to form the light reflective layer on or above the recording layer.

Protective Layer Forming Process

According to the production method, a protective layer is formed on the light reflective layer. More specifically, the material for protective layer comprising the aforementioned inorganic substance and/or resins is applied by coating or by film-formation in vacuo to form a protective layer. The protective layer is preferably formed using an ultraviolet curable resin by spin coating the resin and applying ultraviolet rays to cure the resin.

As is described above, the present invention can provide optical recording media capable of recording and reproducing information using laser light with a wavelength of from 645 nm to 675 nm and having satisfactory light resistance and storage stability.

The present invention will be illustrated in further detail with reference to several examples below, which are not intended to limit the scope of the present invention.

EXAMPLE 1

Squarylium Compound S-1 (0.98 g) and Squarylium Compound S-2 (0.98 g) were treated with ethyl acetate (8 ml), acetic acid (0.12 g) and aluminum tris(ethylacetoacetate) (0.83 g) at 60° C. for 5 hours, to give a mixture containing Compound A and Compound B shown below.

The MS ($[M-H]^-$) m/z of Compound A was 1552, and that of Compound B was 1620.

Compound A:

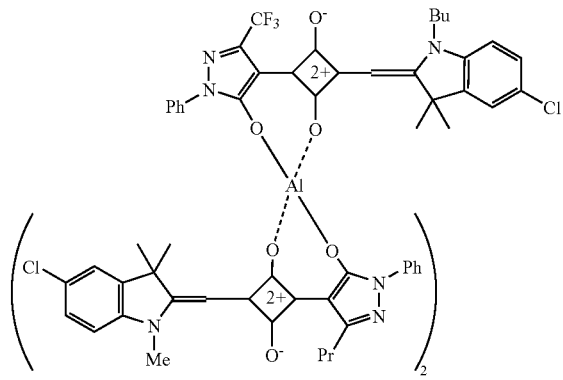

wherein Pr represents propyl group; Bu represents butyl group; and Ph represents phenyl group.

Compound B:

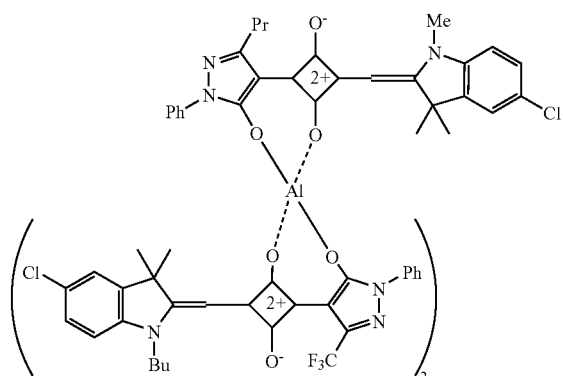

wherein Pr represents propyl group; Bu represents butyl group; and Ph represents phenyl group.

EXAMPLE 2

A total of 15 mg of an aluminum complex compound having a squarylium dye ligand derived from Squarylium Compound S-1 and 55 mg of an aluminum complex compound having a squarylium dye ligand derived from Squarylium Compound S-2 was treated with 10 g of 2,2,3,3-tetrafluoropropanol at room temperature. The resulting solution was analyzed to find that Compound A and Compound B were formed.

The MS ([M−H]$^-$) m/z of Compound A was 1552, and that of Compound B was 1620.

EXAMPLE 3

A first substrate and a second substrate were prepared. Each of these substrates comprised a polycarbonate disc having a diameter of 120 mm and a thickness of 0.6 mm and had a guide groove pattern having a depth of about 1600 angstroms. (160 nm), a width of groove bottom of about 0.22 μm and a track pitch of 0.74 μm on the surface.

The solution containing the squarylium-metal chelate compounds prepared in Example 2 [refers to (S-1)/(S-2) in Table 7] was mixed with Formazan-metal Chelate Compound F-2 (refers to F-2 in Table 2) in a ratio shown in Table 7, to give a coating liquid. The coating liquid was applied to the first substrate by spin coating, to form a recording layer about 1000 angstroms (100 nm) thick. The properties of the dyes are shown in Table 7.

Next, a film of Ag about 1400 angstroms (140 nm) thick was formed on the recording layer by sputtering using Ar as a sputtering gas, to form a reflective layer. A protective layer of an ultraviolet curable resin about 4 μm thick was formed on the reflective layer, and the second substrate was bonded therewith using a hot melt adhesive, to yield an optical recording medium (DVD+R medium) according to Example 3 having a configuration of the first substrate, recording layer (organic dye layer), metal reflective layer, protective layer, adhesive layer, and second substrate arranged in this order.

The above prepared optical recording medium was subjected to a recording test, light-resisting test and storage stability test. The results are shown in Tables 7 and 8.

The optical recording medium had a reflection ratio in its mirror reflecting part of 68% at 645 nm and 86% at 675 nm.

<Recording Test Condition>

DVD (8–16) signals were recorded on the optical recording medium at an oscillation wavelength of 655 nm, numerical aperture NA of 0.65 and a linear velocity of 14 m/s to find that the optimum laser power was 17 mW.

Records recorded at 655 nm were reproduced using a DVD-ROM player optical system having a numerical aperture NA of 0.60 and an oscillation wavelength of 650 nm, and a reproduction waveform was measured.

In addition, the jitter of the pit edge-clock was determined with a time interval analyzer.

Light Resistance Test Condition

The light resistance was determined by continuously irradiating the optical recording medium with Xe light at 50000 Lux for 30 hours and then measuring the reproduction waveform.

Storage Stability Test Condition

The storage stability was determined by leaving the optical recording medium at 50+ C. and relative humidity RH of 80% for 600 hours, and then measuring the reproduction waveform.

The optical recording medium according to Example 3 had good results before (initial values) and after the light resistance test and storage stability test.

EXAMPLE 4

An optical recording medium (DVD+R medium) according to Example 4 was prepared by the procedure of Example 3, except that a solution of squarylium-metal chelate compounds containing Compound A and Compound B was mixed with Formazan-metal Chelate Compound F-2 in a ratio shown in Table 7, to give a coating liquid. The squarylium metal chelate compound solution used herein was prepared by the procedure of Example 2, except using 10 g of an aluminum complex compound having a squarylium dye ligand derived from Squarylium Compound S-1 and 60 g of an aluminum complex compound having a squarylium dye ligand derived from Squarylium Compound S-2.

The properties of the optical recording medium of Example 4 were determined by the procedure of Example 3. The results are shown in Tables 7 and 8. The optical recording medium according to Example 4 had good results before (initial values) and after the light resistance test and storage stability test.

EXAMPLE 5

An optical recording medium (DVD+R medium) according to Example 5 was prepared by the procedure of Example 3, except that a solution of squarylium-metal chelate compounds containing following Compound C and Compound D was mixed with Formazan-metal Chelate Compound F-2 in a ratio shown in Table 7, to give a coating liquid. The squarylium metal chelate compound solution used herein was prepared by the procedure of Example 2, except using 15 g of an aluminum complex compound having a squarylium dye ligand derived from Squarylium Compound S-3 and 55 g of an aluminum complex compound having a squarylium dye ligand derived from Squarylium Compound S-4.

The properties of the optical recording medium of Example 5 were determined by the procedure of Example 3. The results are shown in Tables 7 and 8. The optical recording medium according to Example 5 had good results before (initial values) and after the, light resistance test and storage stability test.

EXAMPLE 6

An optical recording medium (DVD+R medium) according to Example 6 was prepared by the procedure of Example 3, except that a solution of squarylium-metal chelate compounds containing following Compound E and Compound F was mixed with Formazan-metal Chelate Compound F-2 in a ratio shown in Table 7, to give a coating liquid. The squarylium metal chelate compound solution used herein was prepared by the procedure of Example 2, except using 15 g of an aluminum complex compound having a squarylium dye ligand derived from Squarylium Compound S-6 and 55 g of an aluminum complex compound having a squarylium dye ligand derived from Squarylium Compound S-7.

The properties of the optical recording medium of Example 6 were determined by the procedure of Example 3. The results are shown in Tables 7 and 8. The optical recording medium according to Example 6 had good results before (initial values) and after the light resistance test and storage stability test.

Compound C:

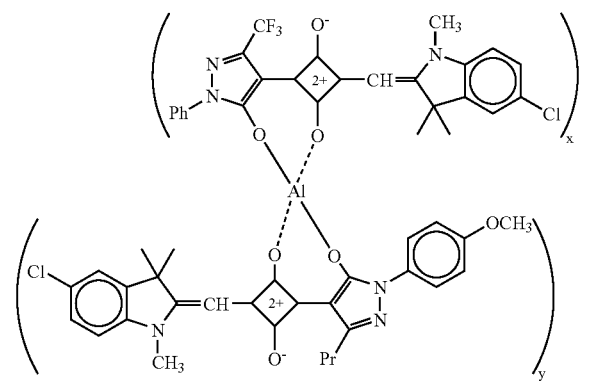

wherein Pr represents propyl group; Ph represents phenyl group; x is 1; and y is 2.

Compound D:

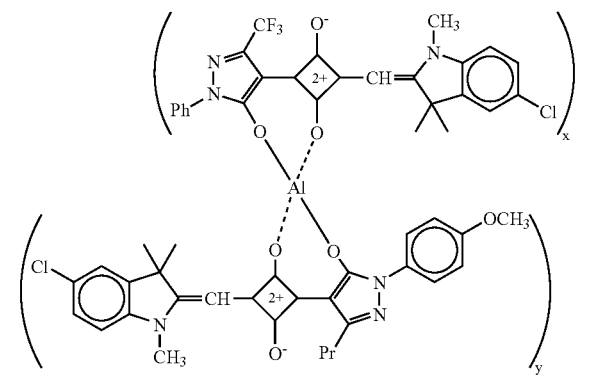

wherein Pr represents propyl group; Ph represents phenyl group; x is 2; and y is 1.

Compound E:

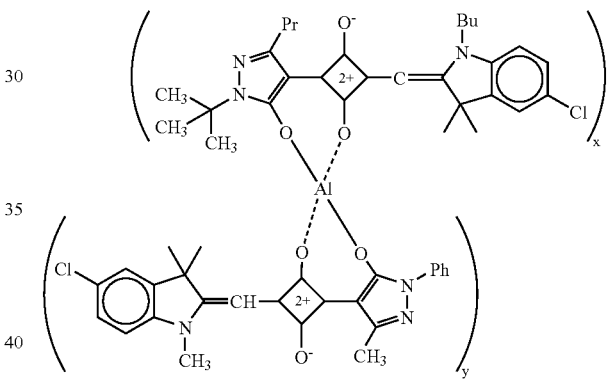

wherein Pr represents propyl group; Bu represents butyl group; Ph represents phenyl group; x is 1; and y is 2.

Compound F:

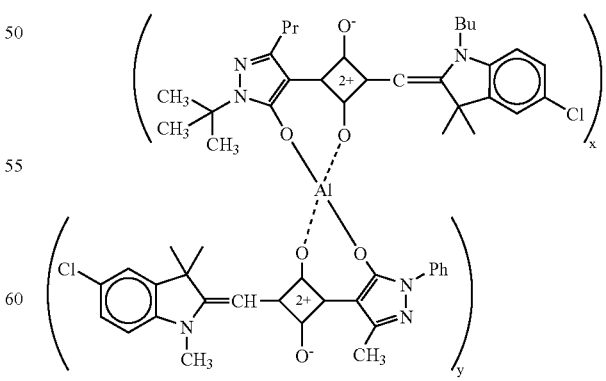

wherein Pr represents propyl group; Bu represents butyl group; Ph represents phenyl group; x is 2; and y is 1.

COMPARATIVE EXAMPLE 1

An optical recording medium (DVD+R medium) according to Comparative Example 1 was prepared by the procedure of Example 3, except that an aluminum complex compound (following Compound G) having a squarylium dye ligand derived from Squarylium Compound S-1 was used alone.

The properties of the optical recording medium according to Comparative Example 1 were determined by the procedure of Example 3. The results are shown in Tables 7 and 8.

Compound G:

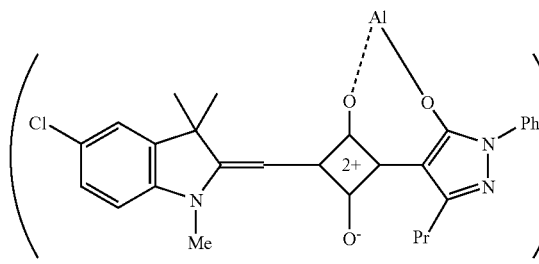

wherein Me represents methyl group; Pr represents propyl group; and Ph represents phenyl group.

COMPARATIVE EXAMPLE 2

An optical recording medium (DVD+R medium) according to Comparative Example 1 was prepared by the procedure of Example 3, except that a coating liquid prepared by mixing an aluminum complex compound (following Compound G) having a squarylium dye ligand derived from Squarylium Compound S-1 with Formazan-metal Chelate Compound F-2 in a ratio shown in Table 7 was used.

The properties of the optical recording medium according to Comparative Example 2 were determined by the procedure of Example 3. The results are shown in Tables 7 and 8.

Compound G:

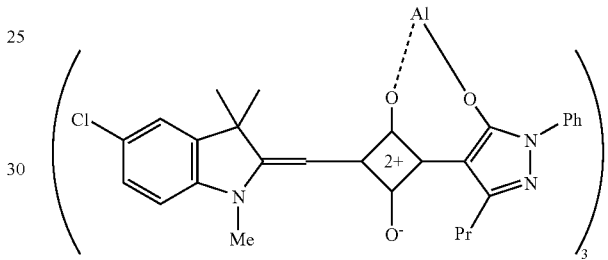

wherein Me represents methyl group; Pr represents propyl group; and Ph represents phenyl group.

TABLE 7

| | Dye* | | | | Initial value | | |
|---|---|---|---|---|---|---|---|
| | Squarylium-metal chelate compound | n/k (660 nm) | Thermal decomposition temperature (° C.) | Formazan-metal chelate compound | Reflection ratio (%) | Modulation factor (%) | Jitter (%) |
| DVD + R specification | | | | | 45 or more | 60 or more | 9 or less |
| Example 3 | S-1/S-2 (70%) | 2.45/0.03 | 295 | F-2 (30%) | 53 | 78 | 7.9 |
| Example 4 | S-1/S-2 (60%) | 2.45/0.03 | 295 | F-2 (40%) | 49 | 80 | 8.5 |
| Example 5 | S-3/S-5 (70%) | 2.37/0.04 | 298 | F-2 (30%) | 52 | 82 | 7.8 |
| Example 6 | S-6/S-7 (70%) | 2.43/0.04 | 331 | F-2 (30%) | 51 | 79 | 8.3 |
| Comp. Ex. 1 | S-1 (100%) | 2.62/0.015 | 318 | — | 62 | 85 | 9.2 |
| Comp. Ex. 2 | S-1 (70%) | 2.37/0.03 | 283 | F-2 (30%) | 55 | 80 | 9.5 |

*The values in the parentheses each represent a weight ratio of the squarylium-metal chelate compound and the formazan-metal chelate compound.

TABLE 8

|  | After light resistance test | | After storage | |
| --- | --- | --- | --- | --- |
|  | Reflection ratio (%) | Modulation factor (%) | Reflection ratio (%) | Modulation factor (%) |
| DVD + R specification | 45 or more | 60 or more | 45 or more | 60 or more |
| Example 3 | 54 | 80 | 53 | 78 |
| Example 4 | 49 | 80 | 49 | 80 |
| Example 5 | 52 | 83 | 52 | 82 |
| Example 6 | 52 | 82 | 51 | 79 |
| Comp. Ex. 1 | 50 | 20 or less | — | — |
| Comp. Ex. 2 | — | — | — | — |

What is claimed is:

1. The optical recording medium comprising:
a substrate; and
at least one recording layer arranged on or above the substrate,
wherein the recording layer comprises two or more different squarylium-metal chelate compounds represented by following Structural Formula (1):

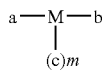

(1)

wherein M represents a metal atom capable of coordinating; "a" "b" and "c" each represent a squarylium dye ligand represented by following Structural Formula (2), where "a" is different from "b"; and "c" may be the same as or different from "a" or "b"; and "m" represents 0 or 1:

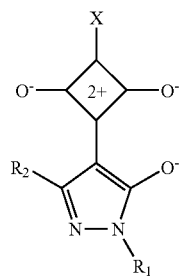

(2)

wherein $R_1$ and $R_2$ are the same or different and each represents one of an alkyl group, an aralkyl group, an aryl group and a heterocyclic group, each of which may be substituted; and X represents one of an aryl group which may be substituted, a heterocyclic group which may be substituted and $Z_3$=CH—, wherein $Z_3$ represents a heterocyclic group which may be substituted,
wherein the recording layer further comprises at least one formazan-metal chelate compound comprising a metal and a formazan compound represented by following Structural Formula (4):

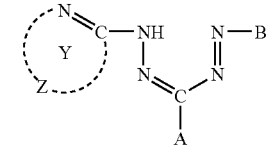

(4)

wherein Ring Y represents a nitrogen-containing 5-membered or 6-membered ring which may be substituted and which may be condensed with another ring; Z represents an atomic group constituting Ring Y; and A and B each represent a substituent, and
wherein the content of the formazan-metal chelate compound in the recording layer is from 20% by weight to 40% by weight and the weight ratio of the squarylium-metal chelate to the formazan-metal chelate compound is from 80:20 to 60:40.

2. The optical recording medium according to claim 1, wherein X is represented by following Structural Formula (3):

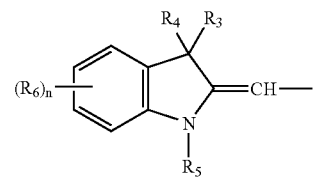

(3)

wherein $R_3$ and $R_4$ are the same or different and each represents a substituted or unsubstituted alkyl group, where $R_3$ and $R_4$ may be taken together with an adjacent carbon atom to form a ring; $R_5$ represents one of a hydrogen atom, an alkyl group which may be substituted, an aralkyl group which may be substituted and an aryl group which may be substituted; $R_6$ represents one of a halogen atom, an alkyl group which may be substituted, an aralkyl group which may be substituted, an aryl group which may be substituted, a nitro group, a cyano group and an alkoxy group; and "n" represents an integer from 0 to 4, wherein, when n is 2, 3 or 4, "$R_6$"s may be the same as or different from each other and adjacent two "$R_6$"s may be taken together with an adjacent carbon atom to form a ring.

3. The optical recording medium, according to claim 1, wherein M is a trivalent metal.

4. The optical recording medium according to claim 3, wherein the trivalent metal is aluminum.

5. The optical recording medium according to claim 1, wherein the recording layer comprises two to six different types of the squarylium-metal chelate compounds.

6. The optical recording medium according to claim 1, wherein the total content of the squarylium-metal chelate compounds in the recording layer is from 50% by weight to 100% by weight.

7. The optical recording medium according to claim 1, wherein the recording material has a thermal decomposition temperature of from 200° C. to 350° C.

8. The optical recording medium according to claim 1, wherein the recording layer has a thickness of from 100 angstroms to 5000 angstroms (from 10 nm to 500 nm).

9. The optical recording medium according to claim 1, wherein the recording medium performs recording and reproducing by the application of light with a wavelength of 645 nm to 675 nm and the recording layer itself has a refractive index n of 1.5 to 3.0 and an extinction coefficient k of 0.02 to 0.3 within a wavelength region ±5 nm of the light for recording and reproducing.

10. The optical recording medium according to claim 1, wherein the substrate has at least one of a groove and a pit on its surface.

11. The optical recording medium according to claim 1, further comprising a reflective layer on or above the recording layer.

12. The optical recording medium according to claim 11, further comprising a protective layer on or above the reflective layer.

13. The optical recording medium according to claim 1, which is for use in any one of CD-R, DVD+R and DVD−R media.

* * * * *